US012132733B2

(12) United States Patent
Friedrich et al.

(10) Patent No.: US 12,132,733 B2
(45) Date of Patent: Oct. 29, 2024

(54) METHOD AND DEVICE FOR DETERMINING NETWORK DEVICE STATUS

(71) Applicant: FORESCOUT TECHNOLOGIES, INC., San Jose, CA (US)

(72) Inventors: Gil Friedrich, Tel Aviv (IL); Roy Rotem, Tel Aviv (NL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 283 days.

(21) Appl. No.: 17/497,686

(22) Filed: Oct. 8, 2021

(65) Prior Publication Data

US 2022/0200991 A1 Jun. 23, 2022

Related U.S. Application Data

(63) Continuation of application No. 14/153,110, filed on Jan. 13, 2014, now Pat. No. 11,146,559, which is a continuation of application No. 12/526,957, filed as application No. PCT/IL2008/000199 on Feb. 14, 2008, now Pat. No. 8,639,800.

(60) Provisional application No. 60/890,195, filed on Feb. 16, 2007.

(51) Int. Cl.
*G06F 15/16* (2006.01)
*H04L 9/40* (2022.01)

(52) U.S. Cl.
CPC .............. *H04L 63/10* (2013.01); *H04L 63/08* (2013.01); *H04L 63/1408* (2013.01)

(58) Field of Classification Search
CPC ...... H04L 63/10; H04L 63/08; H04L 63/1408
See application file for complete search history.

(56) References Cited

U.S. PATENT DOCUMENTS

| | | | |
|---|---|---|---|
| 6,363,489 B1 | 3/2002 | Comay et al. | |
| 6,405,318 B1 | 6/2002 | Rowland | |
| 6,463,474 B1 | 10/2002 | Fuh et al. | |
| 6,490,620 B1 | 12/2002 | Ditmer et al. | |
| 6,748,540 B1* | 6/2004 | Canestaro | G06F 21/552 |
| | | | 709/224 |
| 8,639,800 B2 | 1/2014 | Friedrich et al. | |
| 2002/0019948 A1 | 2/2002 | Katou et al. | |
| 2002/0078382 A1 | 6/2002 | Sheikh et al. | |
| 2004/0117665 A1 | 6/2004 | Ong | |
| 2005/0063377 A1* | 3/2005 | Bryant | H04L 63/0227 |
| | | | 370/389 |
| 2005/0278775 A1 | 12/2005 | Ross | |
| 2006/0031436 A1 | 2/2006 | Sakata et al. | |
| 2006/0114872 A1 | 6/2006 | Hamada | |
| 2006/0143117 A1 | 6/2006 | Chigira et al. | |
| 2007/0011446 A1 | 1/2007 | Kato et al. | |
| 2007/0050634 A1* | 3/2007 | Makimoto | G06F 21/32 |
| | | | 726/16 |

(Continued)

OTHER PUBLICATIONS

International Search Report and Written Opinion for PCT/IL0B/00199 mailed Jan. 9, 2009.

*Primary Examiner* — Oleg Survillo
(74) *Attorney, Agent, or Firm* — Womble Bond Dickinson (US) LLP

(57) ABSTRACT

Disclosed is a method of transparently detecting authentication status of endpoint devices in a network. This method may be used for differentiating guest or rogue endpoints from enterprise endpoints.

20 Claims, 6 Drawing Sheets

(56) References Cited

U.S. PATENT DOCUMENTS

| | | |
|---|---|---|
| 2007/0127438 A1 | 6/2007 | Newman et al. |
| 2007/0162954 A1 | 7/2007 | Pela |
| 2007/0214270 A1 | 9/2007 | Absillis |
| 2008/0022397 A1* | 1/2008 | Cheng ................ H04L 63/1433 726/20 |
| 2008/0034412 A1* | 2/2008 | Wahl ....................... G06F 21/41 726/8 |
| 2008/0034425 A1 | 2/2008 | Overcash et al. |
| 2008/0046966 A1* | 2/2008 | Rhoades ................ H04L 63/08 726/2 |
| 2008/0072283 A1 | 3/2008 | Relyea et al. |
| 2008/0129451 A1 | 6/2008 | Smires et al. |
| 2008/0148059 A1 | 6/2008 | Shapiro |
| 2008/0155651 A1* | 6/2008 | Wasmund ............... G06F 21/55 726/2 |
| 2008/0307501 A1 | 12/2008 | Marsico et al. |
| 2009/0028118 A1* | 1/2009 | Gray .................. H04L 63/1416 370/338 |
| 2009/0274060 A1 | 11/2009 | Taylor |
| 2010/0106824 A1 | 4/2010 | Friedrich et al. |
| 2010/0146613 A1 | 6/2010 | Hall et al. |
| 2010/0333176 A1 | 12/2010 | Vank et al. |
| 2011/0099375 A1 | 4/2011 | Hammes et al. |
| 2011/0255688 A1 | 10/2011 | Spalink et al. |
| 2012/0255035 A1 | 10/2012 | Orsini et al. |
| 2012/0284778 A1* | 11/2012 | Chiou ..................... G06F 21/31 726/4 |
| 2013/0212405 A1 | 8/2013 | Orsini et al. |
| 2014/0181610 A1 | 6/2014 | Munson et al. |

* cited by examiner

METHOD AND DEVICE FOR DETERMINING NETWORK DEVICE STATUS

RELATED APPLICATION

This application is a continuation of U.S. patent application Ser. No. 14/153,110, filed Jan. 13, 2014, which is a continuation of U.S. patent application Ser. No. 12/526,957, filed Aug. 13, 2009, now U.S. Pat. No. 8,639,800, issued Jan. 28, 2014, which is a U.S. National Stage 371 of PCT International Application No.: PCT/IL2008/000199, filed Feb. 14, 2008, which claims priority to U.S. Provisional Patent Application No. 60/890,195, filed Feb. 16, 2007, which are hereby incorporated by reference in its entirety.

FIELD OF THE INVENTION

The present invention relates generally to the field of network security and management. More specifically, the present invention relates to a method for differentiating enterprise systems from guest/rogue machines on a network.

BACKGROUND

Widespread use of networks to interconnect heterogeneous computer services is common today. Typically, in a distributed processing environment, a user will access an unsecured workstation and, using the workstation itself, access a variety of other computer services on the network. As the use of networks has increased, however, so have the problems relating to securing and controlling the legitimate access of users to the computer systems.

Traditionally, access to computer services was controlled through the use of passwords. For each service, a user was associated with a user id and a password. Both the computer system and the user who wished to access a service had to know the password. The user provided the user id and the computer systems challenged the user to then provide the password. This initiated access to the system.

In a distributed processing environment, a user often needs to access resources located at multiple servers from multiple workstations interconnected via a communications network. Authentication to each host accessed is crucial, but presenting separate user id/password pairs can be both unwieldy and unsecure. What is needed is a mechanism which requires users to identify and authenticate themselves once to a trusted agent which then performs the necessary user identification and authentication to each accessed resource transparently. This is known as unitary login.

Previous work in developing secure unitary login protocols for distributed systems include those intended for open environments (e.g., the Massachusetts Institute of Technology Kerberos protocol, the Digital Equipment Corporation SPX protocol, the Carnegie Mellon University Strongbox protocol, and the ISO OSI Directory Services protocols) and those intended for closed environments (e.g., the World Wide Military Command and Control System (WWMCCS) Information System Network Authentication Service (WIS-NAS) protocol, the Department of Defense Intelligence Information System Network Security for Information Exchange (DNSIX) protocol, and the Strategic Air Command Intelligence Network (SACINTNET) protocol). Each of there protocols provides different authentication services, but a common property of all is the required workstation configuration, which may not always be possible or feasible. Organizations could greatly ease the problems associated with user authentication with a method for authenticating users without workstation configuration.

There is a need in the field of network security and management for improved methods of transparently authenticating users and identifying enterprise machines that could otherwise not be identified.

SUMMARY OF THE INVENTION

According to some embodiments of the present invention, there is provided a device and method by which to determine a status of an unauthenticated device connected to a data network. According to some embodiments of the present invention, data traffic between the unauthenticated device and an authentication server is monitored by a network monitoring device. According to some embodiments of the present invention, an unauthenticated device may be marked as guest upon discovery by the network monitoring device. In the event that the monitoring device detects a successful login, a record in a device status data table associated with the unauthenticated device may be updated to indicate that the device is a non-guest device. If the monitoring device detects one or more failed login attempts, a record in a device status data table may either be left unchanged or may be changed to indicate that the unauthenticated device is a rogue device.

According to some embodiments of the present invention, the monitoring device may be connected to the network inline; namely, in the data path between the clients and the servers. According to some other embodiments of the present invention, the monitoring device may be connected not inline, in which case the device passively monitors network traffic that may be replicated to it by the communication equipment, or by other means.

According to some embodiments of the present invention, the authentication server may be a server using a network protocol which allows or requires user authentication, such as, but not limited to, an HTTP web server, a Telnet server, a NetBIOS server, an FTP server, An MS Exchange server (MAPI) or a POP3 or IMAP4 mail server. According to some embodiments of the present invention, the administrator of the monitoring device may define which authentication servers are to be monitored.

According to further embodiments of the present invention, the monitoring device may determine login success/failure based on the communication between the unauthenticated device and an authentication server. According to further embodiments of the present invention, a reply from the authentication server indicating success may be interpreted as a successful login, and a reply from the authentication server indicating failure or error may be interpreted as a login failure.

According to some embodiments of the present invention, should the authentication succeed, the monitoring device may change the record in a device status data table associated with the unauthenticated device to indicate that the device is a non-guest device, and therefore may be allowed to access network resources which are limited to authenticated users only. According to some embodiments of the present invention, should the authentication fail the monitoring device may retain the guest status for the unauthenticated device and let it attempt authentication again, or may update its status to rogue device and further limit its access to the network.

DETAILED DESCRIPTION

Figure 1:
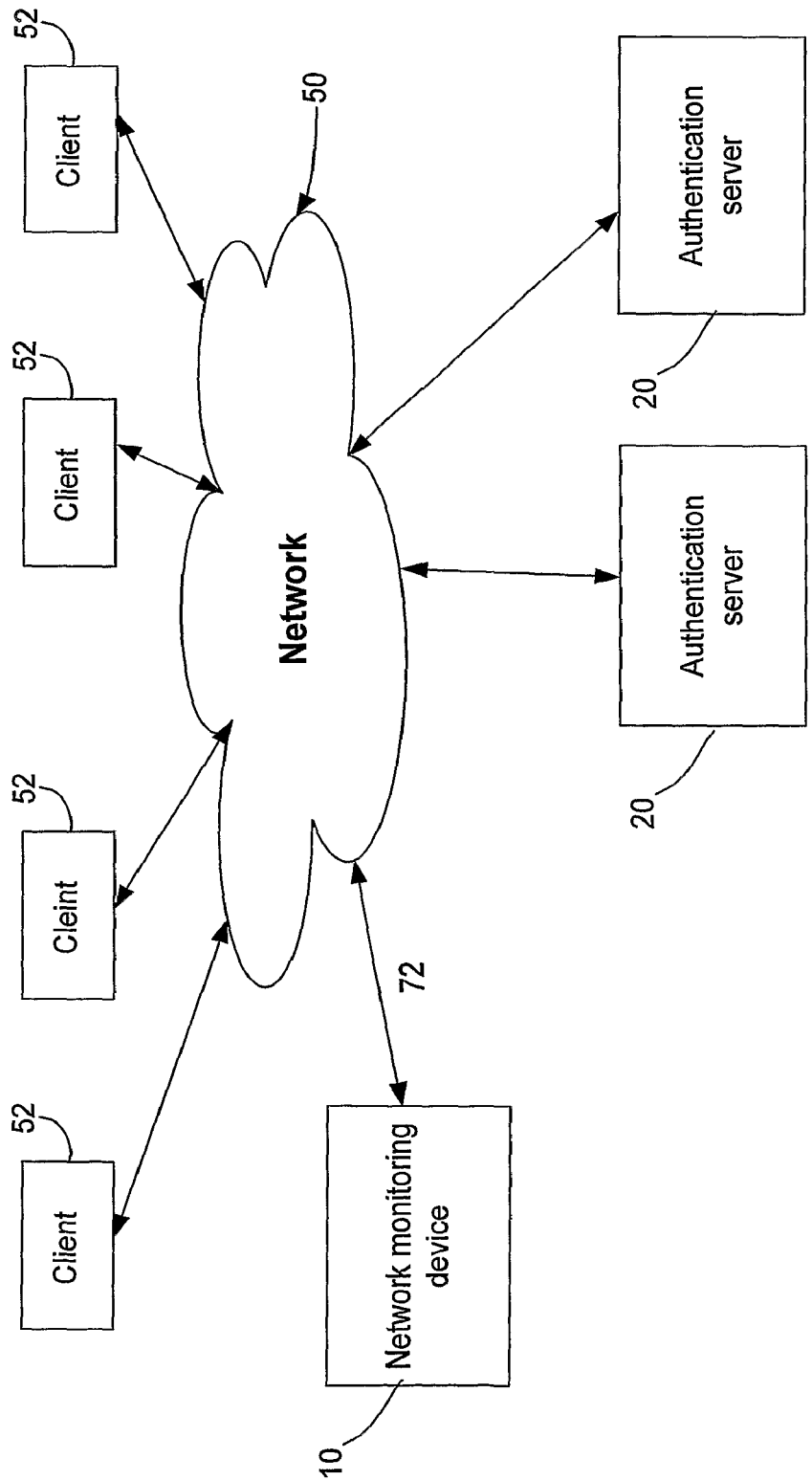
FIG. 1 is a general topological diagram showing an exemplary integration of a network monitoring device into a network.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EE-PROMs), magnetic or optical cards, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions described herein.

According to some embodiments of the present invention, there are provided devices and methods to determine a status of an unauthenticated device connected to a data network. According to some embodiments of the present invention, data traffic between the unauthenticated device and an authentication server is monitored by a network monitoring device. According to some embodiments of the present invention, an unauthenticated device may be marked as guest upon discovery by the network monitoring device. In the event that the monitoring device detects a successful login, a record in a device status data table associated with the unauthenticated device may be updated to indicate that the device is a non-guest device. If the monitoring device detects one or more failed login attempts, a record in a device status data table may either be left unchanged or may be changed to indicate that the unauthenticated device is a rogue device.

According to some embodiments of the present invention, the monitoring device may be connected to the network inline, in which case the device is in the data path between the clients and the servers and actively forwards network traffic. According to other embodiments of the present invention, the monitoring device may be connected not inline, in which case the device passively monitors network traffic that may be replicated to it by the communication equipment, or by other means.

According to some embodiments of the present invention, the authentication server may be a server using a network protocol which allows or requires user authentication, such as, but not limited to, an HTTP web server, a Telnet server, a NetBIOS server, an FTP server, An MS Exchange server (MAPI) or a POP3 or IMAP4 mail server. According to some embodiments of the present invention, the administrator of the monitoring device may define which authentication servers are to be monitored.

According to further embodiments of the present invention, the monitoring device may determine login success/failure based on the communication between the unauthenticated device and an authentication server. According to further embodiments of the present invention, a reply from the authentication server indicating success may be interpreted as a successful login, and a reply from the authentication server indicating failure or error may be interpreted as a login failure.

According to some embodiments of the present invention, should the authentication succeed, the monitoring device may change the record in a device status data table associated with the unauthenticated device to indicate that the device is a non-guest device, and therefore may be allowed to access network resources which are limited to authenticated users only. According to some embodiments of the present invention, should the authentication fail the monitoring device may retain the guest status for the unauthenticated device and let it attempt authentication again, or may update its status to rogue device and further limit its access to the network.

According to some embodiments of the present invention, a network monitoring device may be computer software or computer hardware that can intercept traffic passing over a digital network or part of a network, such as a network traffic monitor, or integrated into a packet-forwarding device such as a router, firewall, switch, hub, or any other network-connected device.

According to some embodiments of the present invention, an authentication server may be a server that provides authentication services to users or other systems. Users and other servers may authenticate to such a server, and may receive cryptographic tickets. These tickets may then be exchanged with one another to verify identity.

According to further embodiments of the present invention, an authentication server may be a network-connected device running an authentication service (such as RADIUS, Kerberos, or any other service whose primary use is authentication) or a network service that supports authentication (such as SSH, HTTP, POP3, or IMAP).

Turning now to FIG. 1, there is shown a general topological diagram showing an integration of a network monitoring device into a network, in accordance with some embodiments of the present invention. According to some embodiments of the present invention, monitoring device 10 may be connected to the network in a way that will allow it to monitor data traffic between one or more clients 52 and one or more authentication servers 20.

Various techniques for monitoring network traffic are known in the art and shall not be described in detail in the present application. The present invention is not limited to the use of any particular network monitoring technique. Rather, in accordance with some embodiments of the present invention, any network monitoring technique presently known or to be devised in the future may be used to determine the status of network devices.

Figure 2:
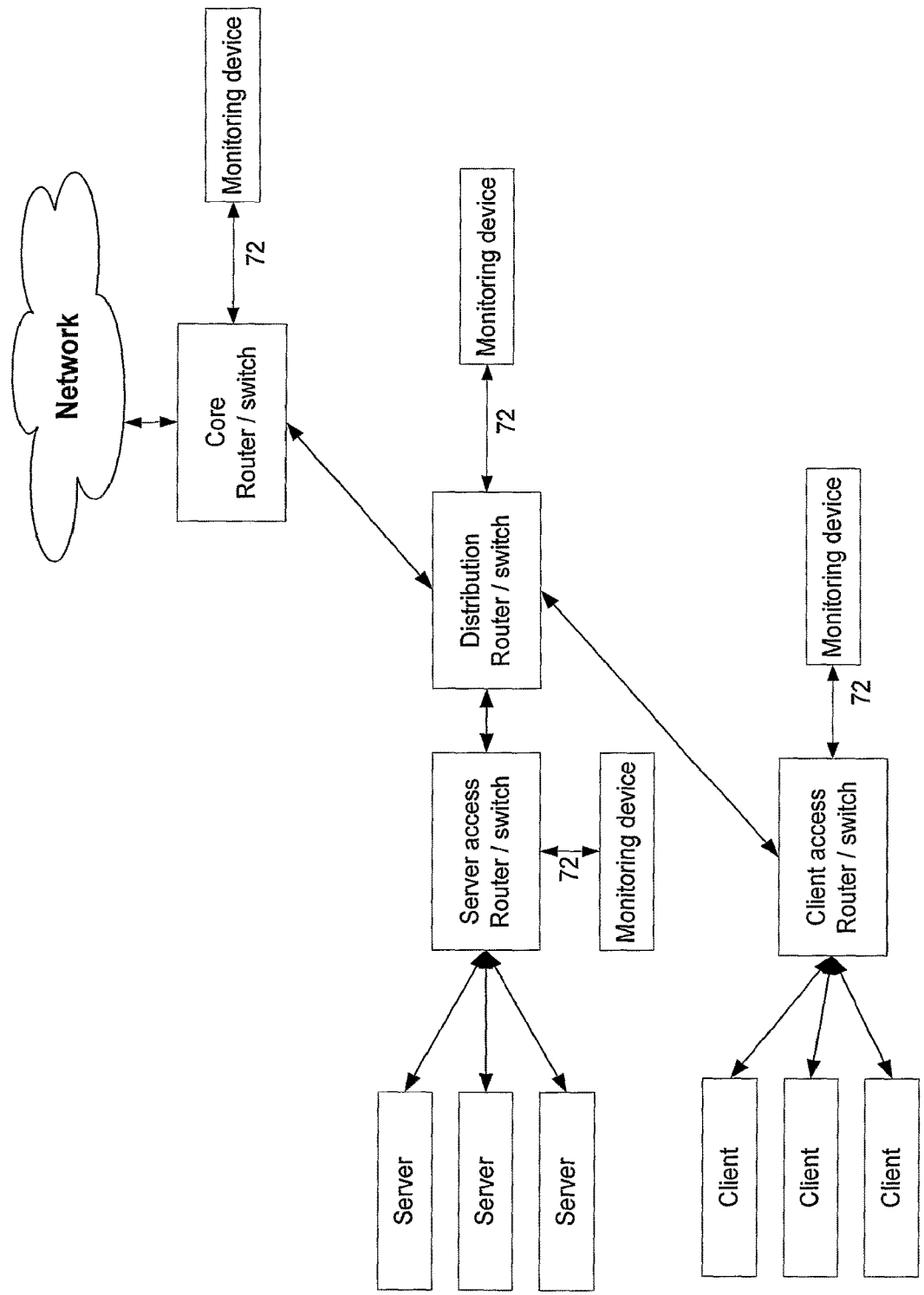
FIG. 2 is a block diagram showing several possible configurations for connecting the monitoring device.

Turning now to FIG. 2, there is shown a block diagram depicting several possible configurations for connecting the monitoring device, in accordance some embodiments of the present invention. According to some embodiments of the present invention, the monitoring device may be connected to an access router or switch, allowing it to monitor and control network traffic related to client systems. According to some embodiments of the present invention, the monitoring device may be connected to a distribution router or switch, allowing it to monitor and control network traffic related to server systems. According to some embodiments of the present invention, the monitoring device may be connected to a core router or switch, allowing it to monitor and control most of the network traffic.

Figure 3:
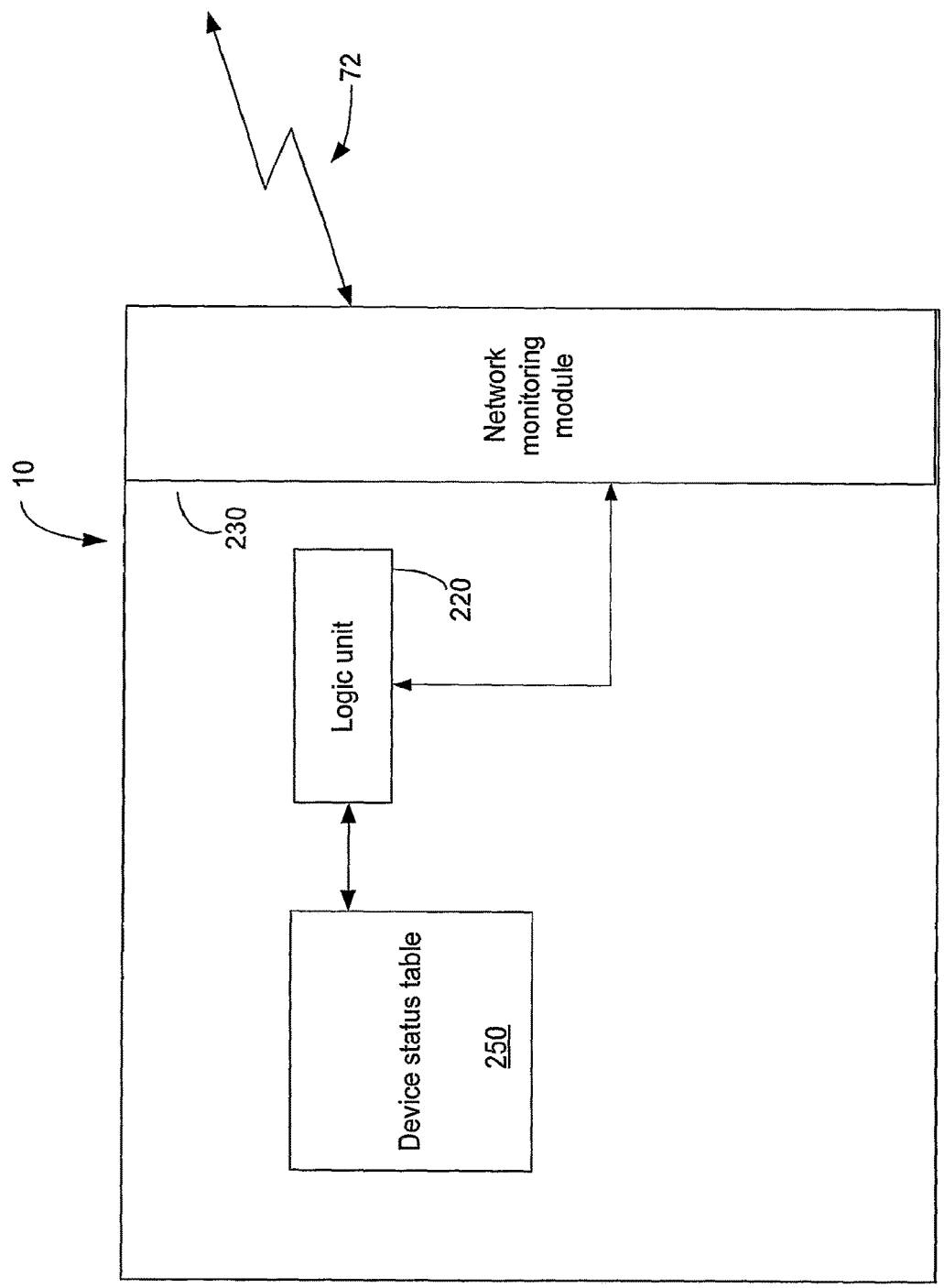
FIG. 3 is a block diagram showing the functional blocks of a device according to some embodiments of the present invention.
Figure 4:
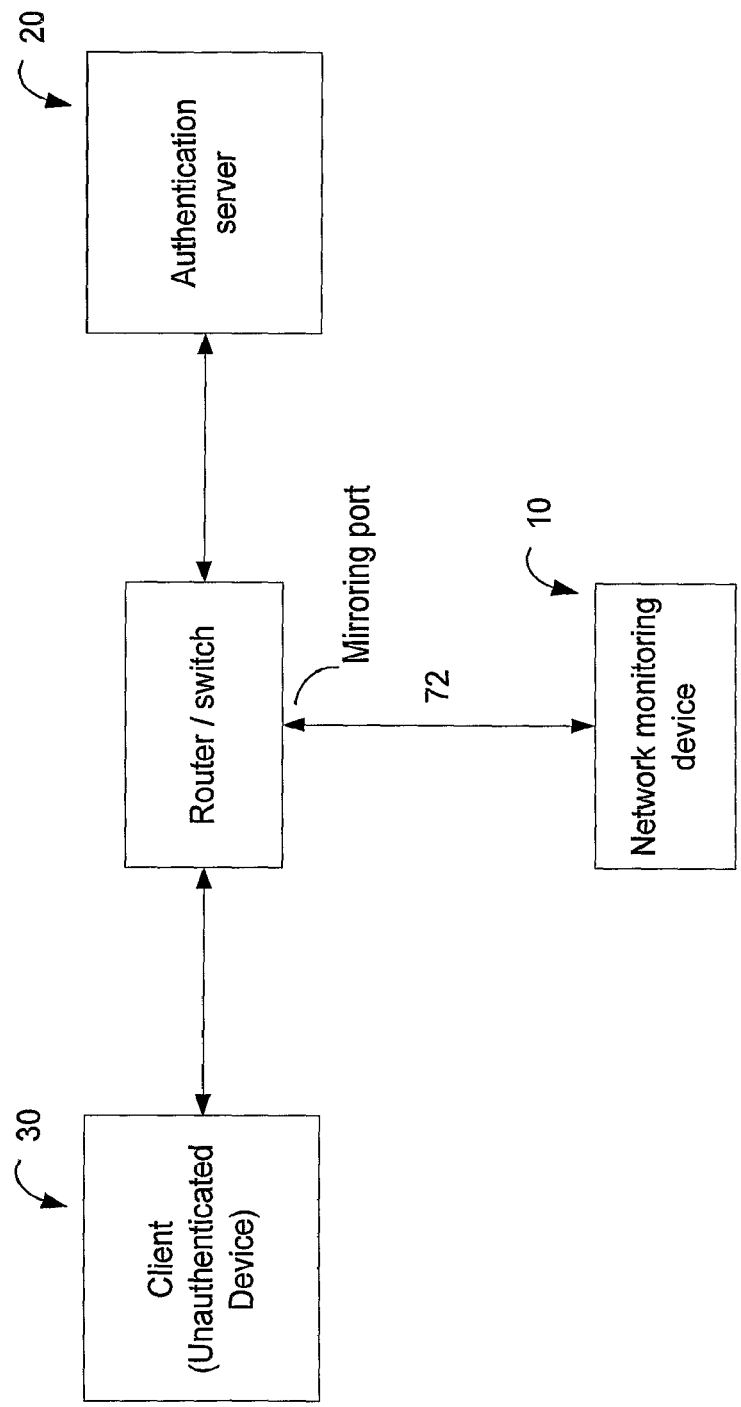
FIG. 4 is a symbolic data flow diagram showing an example of how our device may monitor data traffic between a client and an authentication server.
Figure 5:
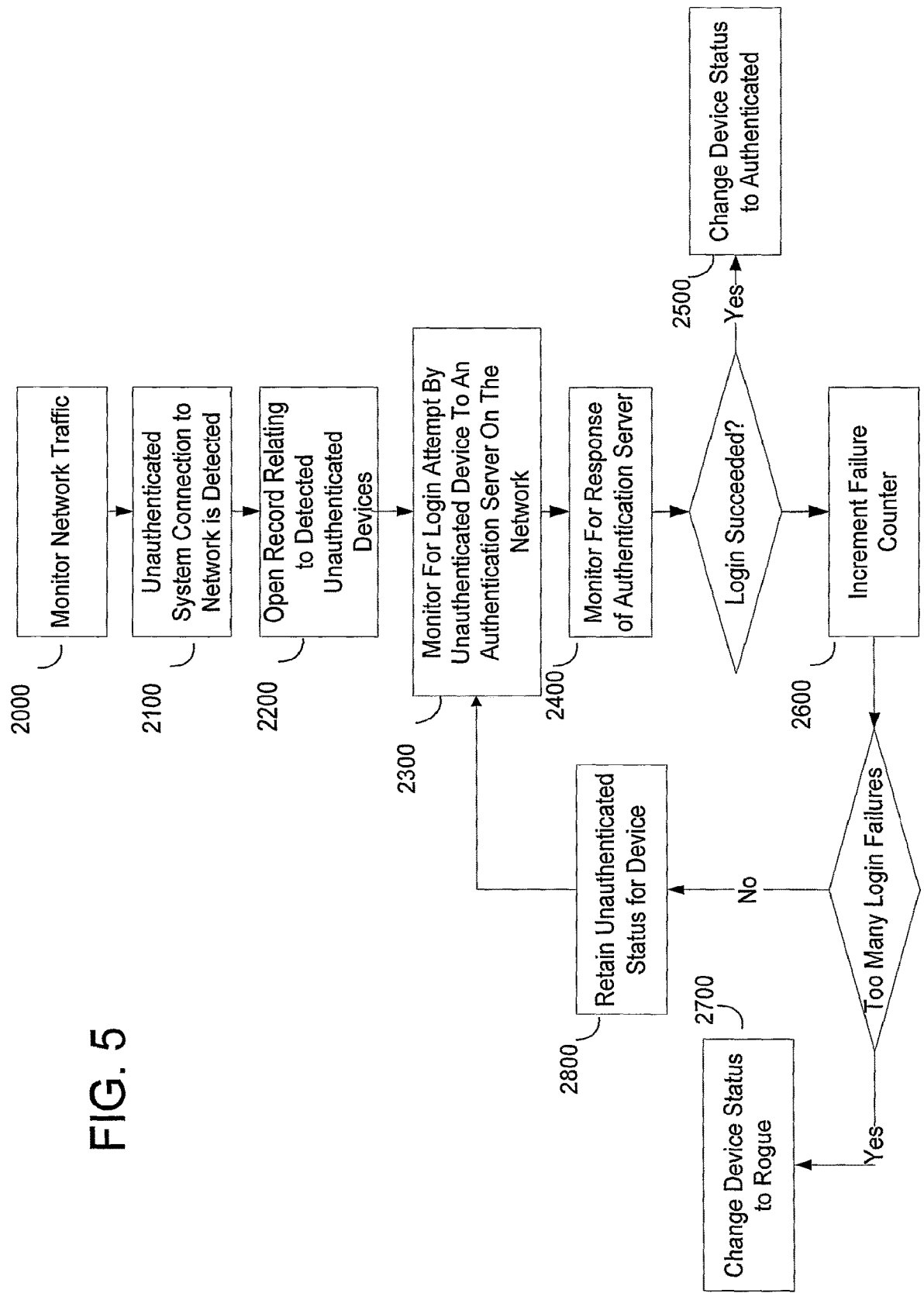
FIG. 5 is a flow chart listing the steps of an exemplary method by which a device, in accordance with some embodiments of the present invention, may determine a network device's status.

Reference is now made to FIG. 3, which is a block diagram showing the functional blocks of a network monitoring device, according to some embodiments of the present invention. The functionality of the network monitoring device depicted in FIG. 3 may be best described in conjunction with: (1) FIG. 4, which is a symbolic data flow diagram of an exemplary monitoring device which is adapted to monitor data traffic between a client and an authentication server, and (2) FIG. 5, which is a flow chart listing the steps of an exemplary method by which a device, in accordance with some embodiments of the present invention, may determine a network devices status. According to some embodiments of the present invention, a network monitoring device 10 may monitor network traffic using the network monitoring module 230 over the network connection 72, as shown in step 2000. According to some embodiments of the present invention, the monitoring module may inspect all data packets forwarded to it to identify network-connected systems and analyze their communications with various authentication servers. According to further embodiments of the present invention, the monitoring may be performed inline. According to alternative embodiments of the present invention, the monitoring may be performed not inline, where the monitoring device receives data replicated by the communication equipment (e.g. switches, hubs, routers etc.).

According to some embodiments of the present invention, the monitoring device 10 may compare the source and/or destination of some or all of the data packets on the network to its device status table 250 to identify unauthenticated systems. Should the monitoring device 10 identify an unauthenticated system 30 connected to the network, as shown in step 2100, it may add a record for it in the device status table 250 and mark it as a guest system, as shown in step 2200. According to some embodiments of the present invention, the monitoring device 10 may look for authentication attempts by the unauthenticated system 30 to an authentication server 20, as shown in step 2300. According to further embodiments of the present invention, the monitoring device 10's logic unit 230 may identify the unauthenticated system's login attempts by analyzing the communication protocol.

According to some embodiments of the present invention, the monitoring device 10 may monitor the network traffic between the unauthenticated system 30 and the authentication server 20, and the logic unit 230 may analyze the server's responses, as shown in step 2400. According to further embodiments of the present invention, the logic unit 230 may analyze the communication protocol and look for data packets containing indication of successful logins, failed logins and/or errors.

According to some embodiments of the present invention, should the monitoring device 10 detect successful authentication, as shown in step 2500, it may change the unauthenticated system 30's status in the device status table 250 from guest to authenticated. According to further embodiments of the present invention, the monitoring device 10 may instruct or otherwise cause other network equipment to change the system 30's access permissions to allow it access to various network resources.

According to some embodiments of the present invention, should the monitoring device 10 detect failed authentication or an error, it may increment a login failure counter in the device status table 250, as shown in step 2600.

According to some embodiments of the present invention, should the login failure counter in the device status table 250 exceed a pre-defined value, the monitoring device 10 may change the unauthenticated system 30's status in the device status table 250 from guest to rogue, as shown in step 2700. According to further embodiments of the present invention, the monitoring device 10 may instruct or otherwise cause other network equipment to change the system 30's access permissions to block its access to various network resources. According to some embodiments of the present invention, if login failure counter in the device status table 250 has not exceeded the pre-defined number of failures, the monitoring device 10 may retain the unauthenticated system 30's guest status, as shown in step 2700, and may continue monitoring its authentication attempts (step 2400).

Figure 6:
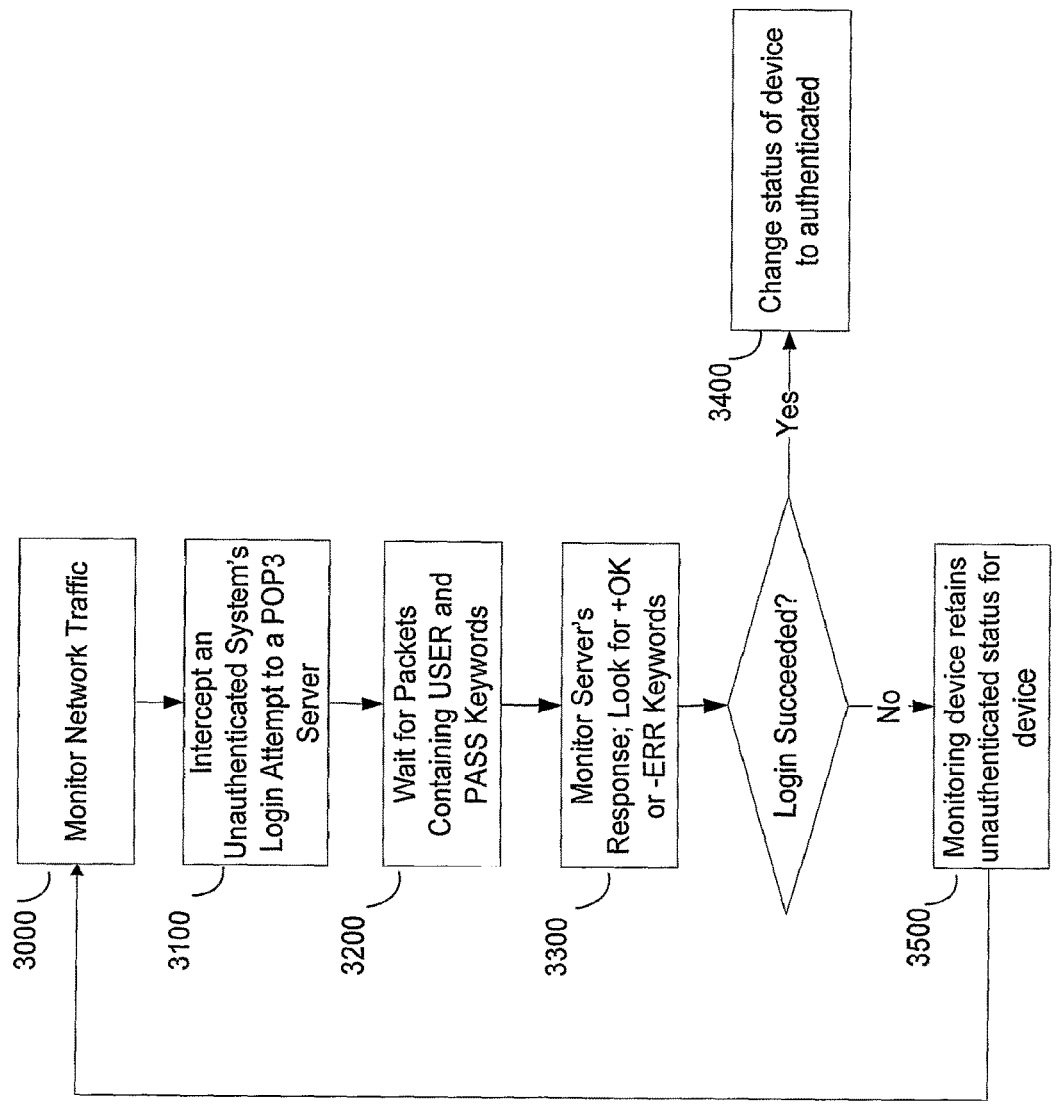
FIG. 6 is a flow chart listing the steps of an exemplary method by which a device, in accordance with some embodiments of the present invention, may determine a network device's status.

Reference is now made to: (1) FIG. 3, which is a block diagram showing the functional blocks of a device according to some embodiments of the present invention, (2) FIG. 4, which is a symbolic data flow diagram showing an example of how our device may monitor data traffic between a client and an authentication server, and (3) FIG. 6, which is a flow chart listing the steps of an exemplary method by which a device in accordance with some embodiments of the present invention may determine a network devices status. According to some embodiments of the present invention, a network monitoring device 10 may monitor network traffic using the network monitoring module 230 over the network connection 72 (step 3000). When the monitoring device 10 identifies an unauthenticated system 30 connecting to POP3 server 20 (step 3100) it marks it as a guest system in its device status table 250 and waits for data packets containing the USER and PASS keywords (step 3200). The monitoring device 10 monitors the network traffic between the unauthenticated system 30 and the authentication server 20 via the network monitoring module 230, and the logic unit 220 analyzes the server 20's response packets (step 3300). Should the authentication succeed (server 20 responds with +OK), the monitoring device 10 changes the unauthenticated system's status from guest to authenticated (step 3400). Should the authentication fail (server 20 responds with −ERR), the monitoring device 10 may retain the unauthenticated system's guest status (step 3500), and may let it attempt authentication again (step 3000).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method comprising:
monitoring network traffic between a source device and an authentication system;
inspecting a data packet from the source device of the network traffic;
determining, based on inspection of the data packet, whether the source device is included in a device status table;
in response to determining that the source device of the data packet is not included in the device status table, adding a record in the device status table corresponding to the source device;
identifying, based on monitoring the network traffic, one or more authentication attempts associated with the source device; and
updating, based on the one or more authentication attempts exceeding a threshold number of failed authentication attempts wherein the threshold number of failed authentication attempts is greater than one, the record in the device status table corresponding to the source device to indicate a status of the source device.

2. The method of claim 1, wherein monitoring network traffic between the source device and the authentication system is performed by a monitoring device communicatively coupled to the source device and the authentication system.

3. The method of claim 1, wherein monitoring network traffic between the source device and the authentication system comprises:
receiving replicated network traffic at a monitoring device, wherein the replicated network traffic is replicated and forwarded to the monitoring device from a network communication device.

4. The method of claim 1, further comprising:
in response to adding the record in the device status table, marking the source device as guest in the device status table.

5. The method of claim 1, wherein updating the record in the device status table comprises:
determining that the one or more authentication attempts were successful; and
marking the source device as authenticated in the device status table.

6. The method of claim 5, further comprising:
in response to marking the source device as authenticated in the device status table, providing the source device with access permissions to one or more network resources.

7. The method of claim 1, wherein updating the record in the device status table comprises:
determining that the threshold number of authentication attempts associated with the source device have failed; and
marking the source device as rogue in the device status table.

8. A system comprising:
a memory; and
a processing device, operatively coupled to the memory, to:
monitor network traffic between a source device and an authentication system;
inspect a data packet from the source device of the network traffic;
determine, based on inspection of the data packet, whether the source device is included in a device status table;
in response to determining that the source device of the data packet is not included in the device status table, add a record in the device status table corresponding to the source device;
identify, based on monitoring the network traffic, one or more authentication attempts associated with the source device; and
update, based on the one or more authentication attempts exceeding a threshold number of failed authentication attempts wherein the threshold number of failed authentication attempts is greater than one, the record in the device status table corresponding to the source device to indicate a status of the source device.

9. The system of claim 8, wherein monitoring network traffic between the source device and the authentication system is performed by a monitoring device communicatively coupled to the source device and the authentication system.

10. The system of claim 8, wherein to monitor network traffic between the source device and the authentication system, the processing device is to:
receive replicated network traffic at a monitoring device, wherein the replicated network traffic is replicated and forwarded to the monitoring device from a network communication device.

11. The system of claim 8, wherein the processing device is further to:
in response to adding the record in the device status table, mark the source device as guest in the device status table.

12. The system of claim 8, wherein to update the record in the device status table, the processing device is to:
determine that the one or more authentication attempts were successful; and
mark the source device as authenticated in the device status table.

13. The system of claim 12, wherein the processing device is further to:
in response to marking the source device as authenticated in the device status table, provide the source device with access permissions to one or more network resources.

14. The system of claim 8, wherein to update the record in the device status table, the processing device is to:
determine that the threshold number of authentication attempts associated with the source device have failed; and
mark the source device as rogue in the device status table.

15. A non-transitory computer readable medium having instructions encoded thereon that, when executed by a processing device, cause the processing device to:
- monitor network traffic between a source device and an authentication system;
- inspect a data packet from the source device of the network traffic;
- determine, based on inspection of the data packet, whether the source device is included in a device status table;
- in response to determining that the source device of the data packet is not included in the device status table, add a record in the device status table corresponding to the source device;
- identify, based on monitoring the network traffic, one or more authentication attempts associated with the source device; and
- update, based on the one or more authentication attempts exceeding a threshold number of failed authentication attempts wherein the threshold number of failed authentication attempts is greater than one, the record in the device status table corresponding to the source device to indicate a status of the source device.

16. The non-transitory computer readable medium of claim 15, wherein monitoring network traffic between the source device and the authentication system is performed by a monitoring device communicatively coupled to the source device and the authentication system.

17. The non-transitory computer readable medium of claim 15, wherein the processing device is further to:
- in response to adding the record in the device status table, mark the source device as guest in the device status table.

18. The non-transitory computer readable medium of claim 15, wherein to update the record in the device status table, the processing device is to:
- determine that the one or more authentication attempts were successful; and
- mark the source device as authenticated in the device status table.

19. The non-transitory computer readable medium of claim 18, wherein the processing device is further to:
- in response to marking the source device as authenticated in the device status table, provide the source device with access permissions to one or more network resources.

20. The non-transitory computer readable medium of claim 15, wherein to update the record in the device status table, the processing device is to:
- determine that the threshold number of authentication attempts associated with the source device have failed; and
- mark the source device as rogue in the device status table.

* * * * *